United States Patent [19]
Stewart et al.

[11] Patent Number: 5,249,270
[45] Date of Patent: Sep. 28, 1993

[54] DEVELOPMENT SYSTEM PROTOCOL

[75] Inventors: J. Marcus Stewart; Karl Osterlund, both of San Jose, Calif.

[73] Assignee: Echelon Corporation, Palo Alto, Calif.

[21] Appl. No.: 677,298

[22] Filed: Mar. 29, 1991

[51] Int. Cl.⁵ .............................................. G06F 13/00
[52] U.S. Cl. ..................................... 395/200; 370/85.5
[58] Field of Search ............................... 395/200, 325; 364/DIG. 1, DIG. 2; 370/94.1, 85.5, 85.1, 85.6; 340/825.05, 825.52

[56] References Cited
U.S. PATENT DOCUMENTS 4,459,588  7/1984  Grow ........................... 370/85.5 X

*Primary Examiner*—Robert L. Richardson
*Attorney, Agent, or Firm*—Blakely, Sokoloff, Taylor & Zafman

[57] ABSTRACT

The present invention works in combination with an integrated set of hardware and software tools that support rapid design, programming, debugging, implementation, and testing of local operation network local operation network nodes and applications. These hardware and software tools speed development by enabling developers to use object-oriented concepts, such as network variables and input/output objects, rather than low-level constructs. The development environment operates with an IBM PC/AT or compatible computer and can grow from a single emulated application node to a completely distributed system of up to 24 emulated nodes and hundreds of remote nodes. The invention is mainly directed to a repeater circuit which is part of a control processor board, and is used to send and receive the serial signals between the PC and connected development stations, and the serial data protocol which enables the development stations to be automatically configured at system start-up. The automatic configuration capability avoids the necessity of manually configuring aerial devices on a network so that each has a unique address.

5 Claims, 3 Drawing Sheets

DEVELOPMENT SYSTEM PROTOCOL

BACKGROUND OF THE INVENTION

The present invention works in combination with an integrated set of hardware and software tools that support rapid design, programming, debugging, implementation, and testing of local operation network nodes and applications. These hardware and software tools speed development by enabling developers to use object-oriented concepts, such as network variables and input-/output objects, rather than low-level constructs.

The development environment operates with an IBM PC/AT or compatible computer and can grow from a single emulated application node to a completely distributed system of up to 24 emulated nodes and hundreds of remote nodes.

Network design, hardware design, and software design are all independent to allow hardware, software, and network development to proceed in parallel. Maintenance time is saved because nodes that have already been programmed need not be reprogrammed each time the network is reconfigured.

During development, local operation network-based applications typically grow from a pair of communicating nodes to large networks of many nodes. Because the hardware development environment must grow with the application, the hardware and software tools support testing of one or two nodes but are capable of expanding too many nodes.

The tools provide an expandable hardware environment with a development station and processor boards. In one embodiment, each development station includes two built-in nodes for managing and monitoring the developer's network and can accommodate up to six processor boards in a cardcage. An interface adaptor installed in the host PC provides high speed communications between the PC and up to four development stations.

Processor boards may be added to each development station to create local operation network application nodes. Each processor board supports one application node. The processor boards accept optional expansion boards that may be used for developing prototype I/O interfaces and transceivers. Transceiver evaluation boards allow for twisted pair, RF, and powerline communications. The developer may also develop custom I/O or transceiver expansion boards.

To simplify network development, the hardware and software tools are independent of the communications medium. Initial development may start with communications occurring over a backplane network built into the development station. Transceiver expansion boards can be added or changed at any time to change the network medium without affecting the software design. Communications across multiple channels and multiple media are supported with router boards.

Nodes are initially developed on a Neuron Emulator, which is a local operation network node that supports source-level debugging and hardware prototypinq. The Neuron Emulator is a processor board which incorporates a 3150 Neuron chip with 64 Kbytes of RAM available from Echelon Corporation of Palo Alto, Calif. which is the owner of the term Neuron as a trademark for the processors and related products sold by Echelon Corporation. Software may be executed independent of target hardware to enable software development to occur even before hardware is available. Each emulator board can have one or two expansion boards for testing with prototype I/O and/or transceiver hardware.

The emulator provides hardware support for fast application download, source-level breakpoints, single-stepping, reset/start/halt, and memory read/write protection. In one embodiment, the emulator also provides a software controlled clock rate that may be set to 10 MHz, 5 MHz, 2.5 MHz, 1.25 MHz, or 625 KHz. A suitable emulator board for use with the present invention is available from Echelon Corporation.

The hardware tools used in conjunction with the present invention typically include a complete single board computer (SBC) that may be used within the development station or used remotely with a transceiver and user-supplied power to create a physically distributed network environment. Once the application software is debugged on the emulator, it may be moved away from the development station using the SBC. In one embodiment, the SBC incorporates a 3150 Neuron chip with 64 Kbytes of non-volatile RAM. The SBC accepts the same I/O and media interface expansion boards as the emulator so that prototype 1/O and transceiver hardware may be tested in a remote node. A suitable SBC is available from Echelon Corporation.

Networks with multiple channels and media may be constructed during development with the router board. In one embodiment, the router board is a processor board incorporating two 3150 Neuron chips and connections for two transceivers designed to provide routing between two network channels. The router may be configured as a learning router, a configurable router, or a bridge. When configured as a learning router, the router monitors network traffic to learn the network topology. The router uses the network topology information to selectively route packets between channels. When operated as a configurable router, the router can use routing tables specified with the network management commands available in the software tools. When configured as a bridge, the router forwards all packets between the two connected channels. A suitable router board for use in conjunction with the present invention is available from Echelon Corporation. The router may be housed inside the development station or operated remotely with a user-supplied external power supply.

Transceiver evaluation boards are optional expansion boards that may be installed on any processor board to provide the physical interface to a local operation network network channel. Suitable transceiver evaluation boards are available from Echelon Corporation for twisted pair, powerline, and RF media.

The 3150 Neuron chip in an emulator board can interface directly with a backplane network to communicate within a limited distance. A twisted-pair transceiver evaluation board can be used to extend prototype networks to the maximum topological and performance boundaries of a local operation network on the twisted-pair media. The units are required in applications that require long distances and a large number of nodes on the network. Twisted pair transceiver evaluation boards are also required to support collision detection on twisted-pair networks. A suitable twisted-pair transceiver evaluation board supporting two data rates: 1.25 Mbps and 78 Kbps is available from Echelon Corporation.

A suitable powerline transceiver evaluation board available from Echelon Corporation provides the physical interface for 90–277 VAC powerlines. The powerline transceiver evaluation unit provides a 9766 bps data rate modulated on high frequency carrier signals. The powerline evaluation unit is typically housed in a stand-alone enclosure that connects to an expansion board mounted on any development station processor board. The stand-alone enclosure includes a power supply for the evaluation unit and provides a +5V, 1.4A output to support a remote SBC.

A suitable radio frequency transceiver evaluation board available from Echelon Corporation provides the physical interface to a radio frequency network. The radio frequency transceiver Evaluation Board provides a 4883 bps data rate using a 49 MHz carrier, and supports reliable communications within buildings at distances up to 30 feet.

Suitable software or application programming tools to provide all the tools required to edit, compile, and debug Neuron C applications, which is the programming language used by the 3150 Neuron chips, are available from Echelon Corporation. The tools are integrated, thereby reducing training time and increasing productivity.

Application programming is supported using an Integrated Development Environment (IDE), also available from Echelon Corporation. The IDE automates the development cycle and provides a common framework for all the software tools. The IDE includes an object database that stores the definition of all objects defined by the user. The object database ensures consistency and simplifies use of the development system since all tools share a common definition of the application.

BRIEF SUMMARY OF THE INVENTION

The interfacing between a development network of one or more development stations and an IBM-PC or compatible computer is implemented by the use of a control processor board with repeater circuit within a development station and an interface adapter card within the PC over a serial data link. In the preferred embodiment, each development station includes a control processor board, a power supply, backplane card, and serial cable. The serial cable is coupled between the control processor board, which includes the repeater circuitry, and the development station interface adaptor which, in the preferred embodiment, is a half size PC/AT plug-in card containing the logic required to interface the PC/AT bus to a 10MBaud serial port on the control processor board. The various components of each development station are installed in a cardcage which also includes slots for holding up to six emulator boards, SBC's or router boards in addition to the control processor board and backplane card, with the protocol in the present embodiment allowing up to 16 nodes per cardcage.

In the preferred embodiment, the power line, twisted pair and radio frequency transceiver boards are implemented as daughter cards which can be attached to the control processor, router, emulator or SBC boards. Suitable interface adaptor cards for the PC and control processor boards for the development stations are available from Echelon Corporation. The backplane carries all communications traffic between the PC (via the interface adaptor/repeater serial link) and the emulator, SBC, and router boards.

The specific implementation details for the cardcage, power supply and backplane card, as well as for the interface adaptor, control processor, emulator board, router and transceivers are all dependent upon one another, which specific implementation details are not needed for an understanding of the present invention, and, therefore, will not be provided except as necessary for such understanding.

In this connection, the invention is mainly directed to i) the repeater circuit, which in the preferred embodiment is part of the control processor board, and is used to send and receive the serial signals between the PC and connected development stations, and ii) the serial data protocol which enables the development stations to be automatically configured at system start-up. The automatic configuration capability avoids the necessity of manually configuring serial devices on a network so that each has a unique address.

DETAILED DESCRIPTION OF THE INVENTION

Figure 1:
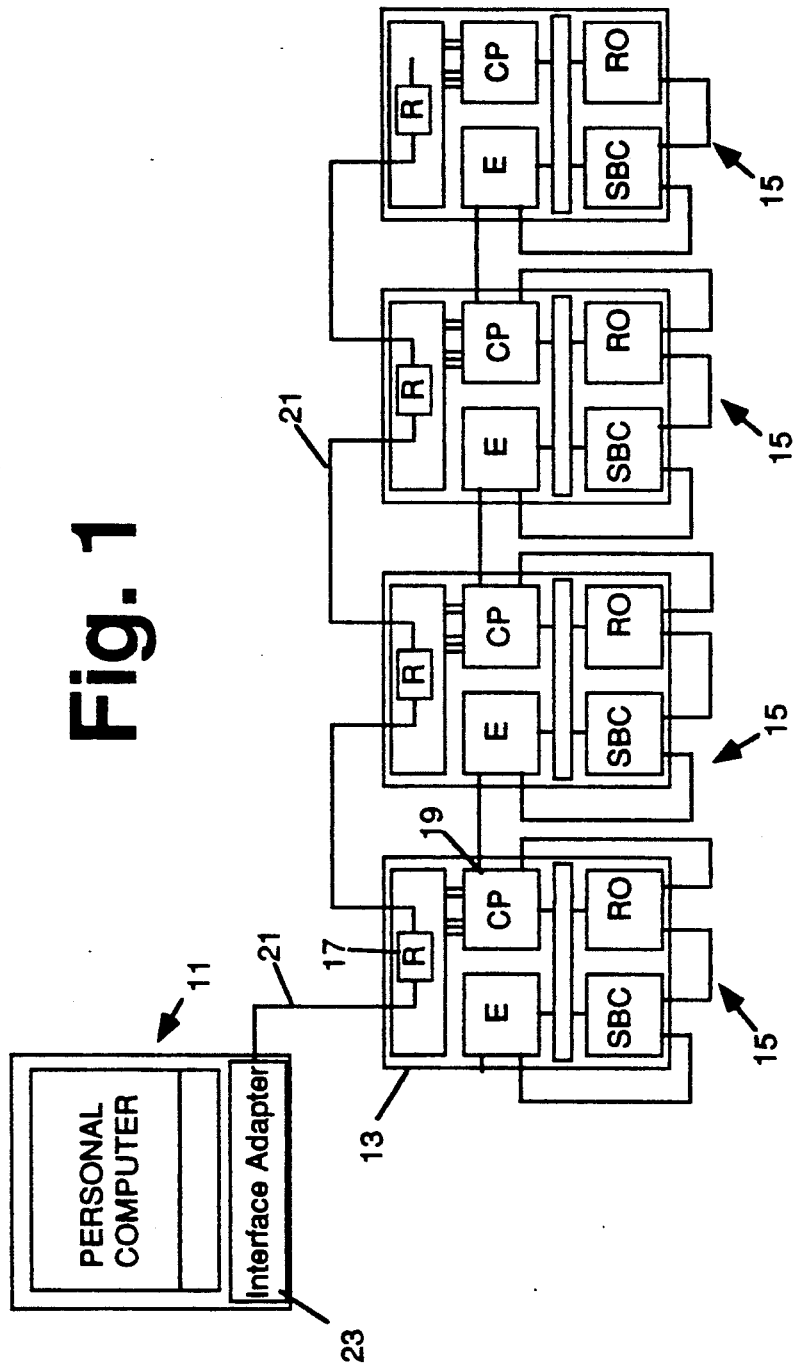
FIG. 1 is a block overview diagram showing the serial link and local operation network connections between a PC and four development stations.

FIG. 1 illustrates the connections between a personal computer 11 and four development stations 13, each including an emulator board (E), control processor board (CP), single board computer (SBC) and router board (RO) as well as repeaters (R) for each development station. The local operation network is illustrated by the connections 15 which are twisted pair wires. Although the repeaters 17 are shown as being coupled to the respective control processor boards 19, as noted above, the repeaters in the preferred embodiment are implemented as part of the control processor boards.

Figure 2:
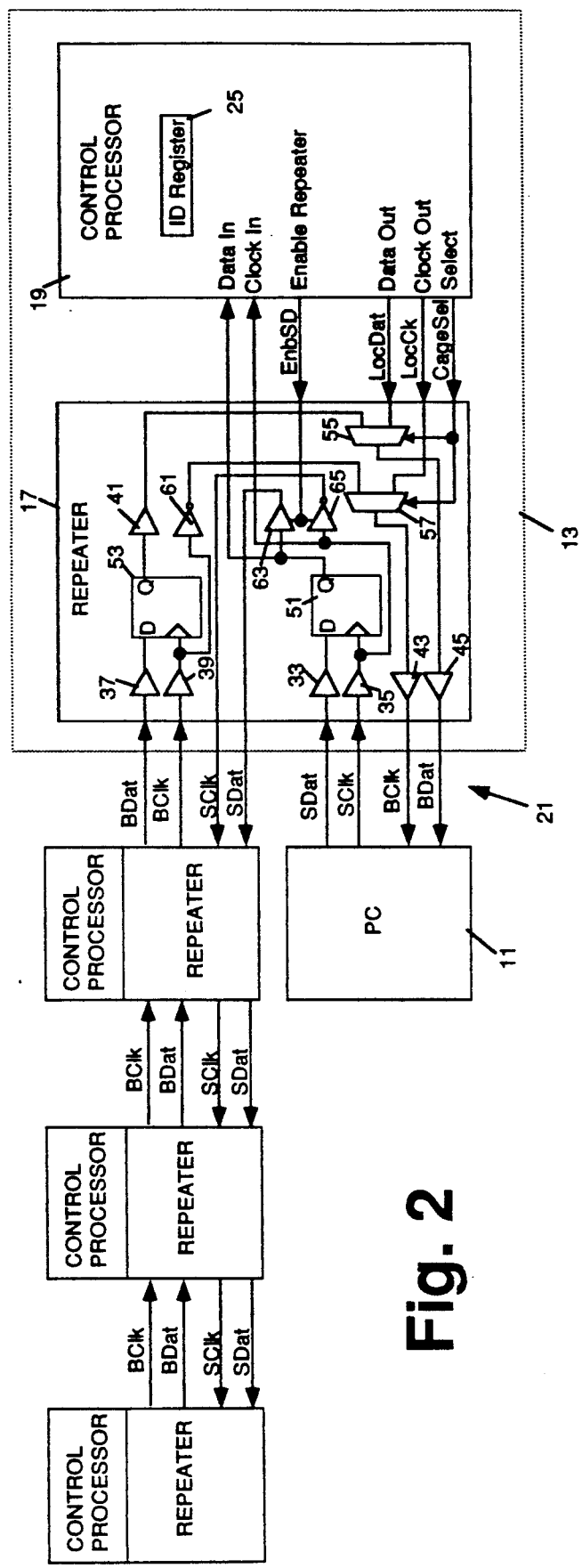
FIG. 2 is a block diagram showing the details of a repeater circuit according to the present invention.

In the preferred embodiment, as shown in FIG. 2, the serial line 21 is implemented as a four signal data link namely system data (SDat) and system clock (SClk) from the PC, and board data (BDat) and board clock (BClk) from the control processors. In the preferred embodiment, the four signals are differential signals carried over eight lines coupled through differential drivers and receivers. However, since the use of eight lines and differential signals is to reduce errors due to interference, the following description assumes a four line system since the differences needed to implement an eight line differential signal system would be readily apparent to persons skilled in the relevant art.

The serial protocol provides that all transactions on the serial link are master-slave type transactions with the interface adaptor card 23 in the PC as the master and a selected one of the development station cardcages 13 as the slave. Slaves never present the link with data that was not requested by the master. All data presented to the link by the master is in the form of one or two sequential bytes of data, the first byte of a two-byte transaction being an eight bit transaction ID byte, and the second byte being the data associated with the transaction. Single-byte transactions may be transaction ID's where no data is required (e.g., reads), or data operating on an earlier transaction ID (e.g., sequential writes). All data presented to the link by a slave is in the form of a single response byte, if required.

With an 8 bit transaction ID byte, up to 256 different transactions are possible for sending to the development stations or other serial link devices (SLDs). In this connection, and bearing in mind that many transactions depend upon particular functions which are desired to be performed, the particulars of which are not important to the present invention, the following is a description of the transactions which relate to the serial link protocol, use of repeater circuits and automatic configuration of the present invention:

1. Select Serial Link Device (Select SLD). This transaction enables the selected SLD for all subsequent transactions, until a new SLD is selected. The control processor board contains an identification register 25 (shown in FIG. 2) which stores a number which is an SLD identification number of the cardcage in which the control processor board is installed. During operation, the SLD identification number stored in this register is compared by logic in the control processor to the data byte immediately following the Select SLD transaction byte. If there is a match, a signal Select is asserted on the line CageSel indicating that that cardcage has been selected. For example, if an emulator in the second cardcage is needed to be accessed, the data byte following the Select Serial Device transaction would contain the value 02H.

2. Change SLD address. For this transaction, the data byte following the transaction ID byte specifies the new SLD address. This transaction is needed to perform automatic configuration as will be described below.

3. Loop Back Request. For this transaction, the PC first selects a cardcage by a Select SLD transaction and then sends a loop back request to the selected cardcage. If the data returned by the selected cardcage is equal to the data in the data byte sent with the loop back request transaction, the PC can assume that the cardcage is present and functional. However, to ensure reliability, two loop back patterns should be used, and neither pattern should use 00H or FFH as the data byte since such values could be returned regardless of whether or not the SLD was present. Once each of the cardcages has been identified, individual nodes within each cardcage can be located by performing memory read/write tests on each of the possible nodes after first selecting the desired node with a Select Node transaction. In the case of a loop back or any other transaction to a nonexistent cardcage or node, the interface adaptor card in the PC should have time out circuitry to force a data pattern of 00H to be returned to the software routine executing in the PC.

With the foregoing transactions available, automatic configuration is performed as follows.

When power is initially applied, all SLDs have a default address of 0 stored in their identification register 25 and the repeater to the next adjacent cardcage is shut off in a manner as described below. Thus, the only SLD that can respond to the PC is the one (development station 13 in FIG. 1) directly connected to the PC. The PC includes software whose first action after power is applied to the SLDs on the network is to initiate a select SLD transaction with the data byte set to 0 which causes the signal Select on line CageSel from control processor 19 to be asserted. The PC then initiates a loop back request transaction. If the control processor responds, a transaction to change the SLD ID address is initiated to provide the SLD with a non-0 address and a configuration table in the PC is updated to show that there is a single SLD which is connected and active.

After the SLD has been changed to have an address that is non-0, the SLD includes logic which asserts a signal (EnbSD) to indicate that it has been enabled which turns on its repeater to the adjacent cardcage thereby connecting the next SLD in the link to the PC. The PC then reruns the above procedure to add the new SLD to its configuration table. The foregoing operation is repeated until all the cardcages have been configured. The PC can be determine when all the cardcages have been configured because there will be no further SLDs responding with an address of 0. At this time, the PC can exit its configuration routine.

Figure 3:
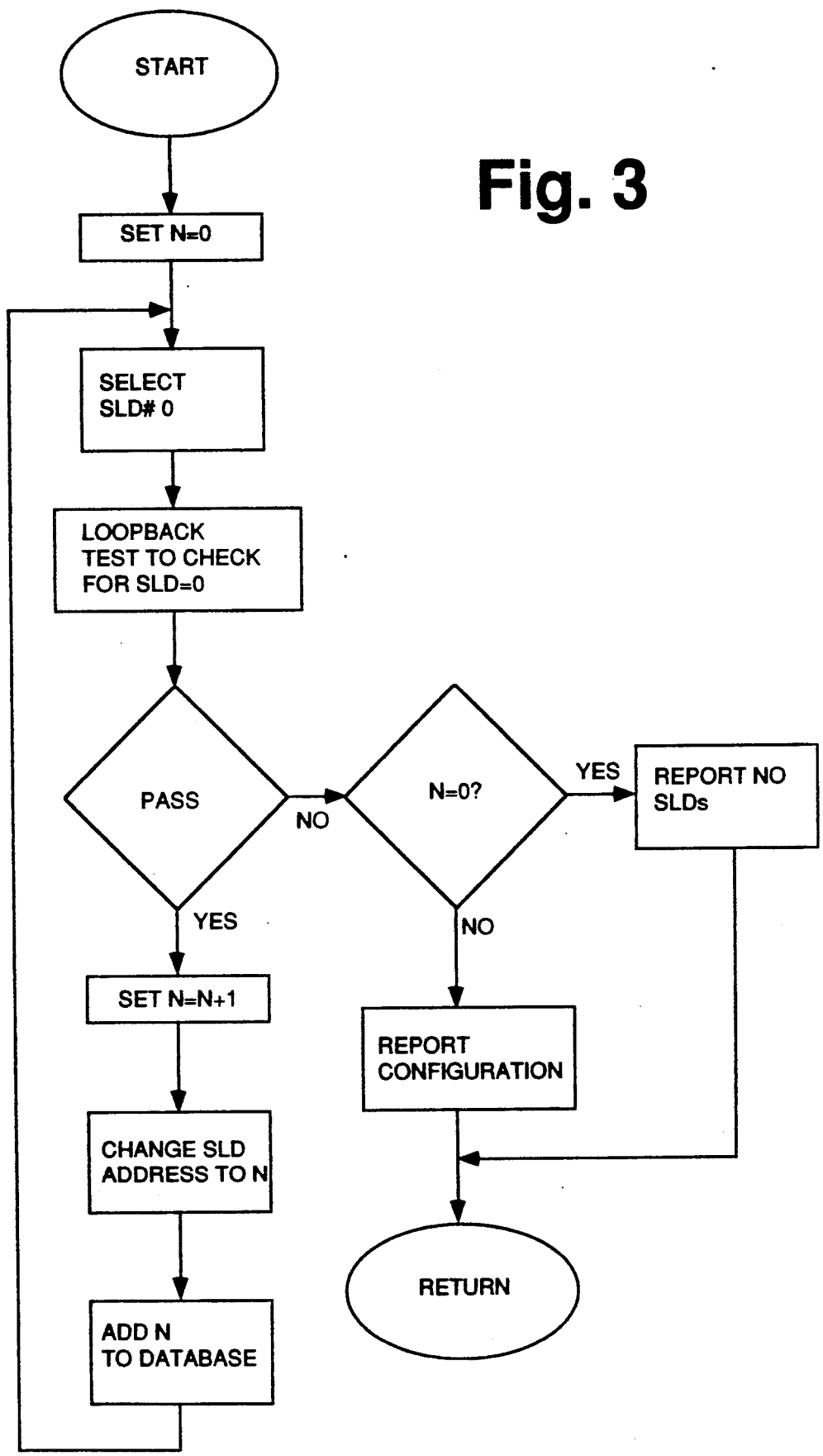
FIG. 3 is a flow chart of a program for performing automatic configuration of devices on the network according to the present invention.

A flowchart showing the flow of a program which allows automatic configuration of serial devices is illustrated in FIG. 3.

Referring again to FIG. 2, the details of a repeater circuit 17 in combination with a control processor 19 with an ID register 25 which allows for automatic configuration of serial devices on a network will now be described.

Repeater circuit 17 comprises buffers 33, 35, 37, 39, 41, 43 and 45, flip flops 51 and 53, multiplexors 55 and 57, inverter 61, switching buffer 63 and switching inverter 65.

The serial data generated by PC 11 is placed on the line SDat with the system clock signal SClk being buffered by buffers 33 and 35 respectively. The data from buffer 33 is stored in flip flop 51 and re-clocked by the clocking signal from buffer 35 and input to the Data In terminal of control processor 19. Control processor 19 converts the serial data from Data In to parallel data according to well known techniques. The SDat and SClk signals are also input to switching buffer 63 and switching inverter 65 respectively. In this connection, since the signal EnbSD is off at system start up, the SDat and SClk signals are not passed by repeater 17 to the next repeater in the link.

Similarly, (and after system configuration has been completed) BDat from a repeater upstream of the repeater directly connected to the PC is input to buffer 37 along with its corresponding clock signal BClk which is input to buffer 39. The data from buffer 37 is re-clocked by flip flop 53 and input to multiplexor 55 through buffer 41.

Depending upon the processing performed by control processor 19, data is placed upon the line LocDat which is a second input to multiplexor 55. If control processor 19 is in the currently selected cardcage, the signal Select on line CageSel is asserted and multiplexor 55 passes the data on LocDat to the PC through buffer 45.

If another card cage is currently selected, BDat from buffer 41 which is input to the multiplexor 55 is selected and passed to the PC through buffer 45. Similar processing takes place with respect to the BClk signal from the upstream repeater through inverter 61, multiplexor 57 and buffer 43.

When the signal EnbSD is asserted by logic within the SLD after its address has been changed from 0, the switching buffer 63 and switching inverter 65 pass the SDat and SClk signals to the repeater upstream of that SLD.

We claim:

1. A system for transferring serial data from a personal computer to at least two daisy chained control processors coupled to said personal computer over a serial data link, and from each of said control processors to said personal computer over said serial link comprising:
a) interface adapter means coupled to said personal computer for converting parallel data generated by said personal computer to serial data for placement on said serial data link, said serial data link being coupled to said interface adapter means;
b) a first repeater means coupled to said serial data link, said serial data link disposed upstream and downstream of said first repeater means, said first repeater means also coupled to a first one of said control processors for selectively transferring data over said serial data link to and from said personal computer and one of i) said first one of said control processors, and ii) at least one repeater means disposed upstream of first repeater means, wherein each of said at least one repeater means disposed upstream of first repeater means is coupled to a corresponding one of said control processors and to said serial data link upstream and downstream of said at least one repeater means;
wherein each of said control processors includes a dynamically updatable identification register means for storing a unique control processor address generated by said personal computer and logic means for asserting i) a select signal when a control processor address generated by said personal computer matches the address stored in said register means, and ii) an enable signal when said register means has been updated by said address generated by said personal computer.

2. The system defined by claim 1 wherein said enable signal is input to the repeater means corresponding to the control processor which generated the enable signal to thereby cause said corresponding repeater means to pass said serial data to the repeater means immediately upstream of said corresponding repeater means.

3. The system defined by claim 1 wherein said select signal is input to the repeater means corresponding to the control processor which generated the select signal to thereby enable said corresponding repeater means to pass said serial data between the control processor which generated the select signal and the personal computer.

4. The system defined by claim 1 wherein each of said repeater means comprises:
a) a first flip-flop whose D input is coupled to said serial data link downstream of said repeater means and whose Q output is coupled to said corresponding control processor and a switch for passing said serial data to the serial data link upstream of said repeater means only when said enable signal generated by said corresponding control processor is asserted;
b) a second flip-flop whose D input is coupled to said serial data link upstream of said repeater means and whose Q output is coupled to a multiplexor, wherein a second input to said multiplexor is data generated by the corresponding control processor, a control input to said multiplexor is said select signal generated by the corresponding control processor, and an output of said multiplexor is coupled to said data link downstream of said repeater means.

5. A method for automatically configuring serial slave devices coupled to each other and to a master device over a serial data link, wherein each of said serial slave devices includes a dynamically updatable register which is initialized with an identical predetermined address and a switch for selectively preventing data on said serial link from being passed to an upstream serial slave device, said method comprising the steps of:
a) setting an address variable to said identical predetermined address;
b) sending said predetermined address over said serial link;
c) testing said serial link for confirmation that one of said serial devices has responded, and if no serial device responded;
  i) determining whether said address variable is equal to said predetermined address, and if there is such equality, reporting that no serial devices were located, and if there is not such equality, reporting the assigned addess of each responding serial device; and
  ii) exiting method
d) if a serial device responded in step c);
  i) incrementing the address variable;
  ii) updating the register in the responding device with the updated address;
  iii) adding the updated address to a database for subsequent reporting; and
  iv) repeating steps b), c) and d) until no serial device responds to the predetermined address.

* * * * *